United States Patent [19]

Saunders et al.

[11] Patent Number: 5,409,007
[45] Date of Patent: Apr. 25, 1995

[54] FILTER TO REDUCE SPECKLE ARTIFACT IN ULTRASOUND IMAGING

[75] Inventors: Rowland F. Saunders, Waukesha; Christopher J. Gilling, Pewaukee; James S. Lehouillier, Waukesha, all of Wis.

[73] Assignee: General Electric Company, Milwaukee, Wis.

[21] Appl. No.: 158,237

[22] Filed: Nov. 26, 1993

[51] Int. Cl.⁶ ............................................. A61B 8/00
[52] U.S. Cl. ......................... 128/661.01; 128/661.08; 73/626
[58] Field of Search ...................... 128/661.01, 661.08, 128/661.09, 661.10, 662.01; 73/625, 626, 609, 596, 597

[56] References Cited

U.S. PATENT DOCUMENTS

| | | | |
|---|---|---|---|
| 4,644,795 | 2/1987 | Augustine | 73/625 |
| 4,683,893 | 8/1987 | Mayo | 128/660.06 |
| 5,199,437 | 4/1993 | Landberg | 128/661.01 |

Primary Examiner—George Manuel
Attorney, Agent, or Firm—Dennis M. Flaherty; John H. Pilarski

[57] ABSTRACT

A method for reducing speckle artifact in an ultrasound image using a two-dimensional median filter having a diamond-shaped five-point kernel. The entire pixel image data is passed through the filter in a manner such that the center point of the kernel is effectively stepped down each range vector in sequence. The magnitudes of the pixel data at each of the five points in the kernel are compared and the value which has the middle magnitude is adopted as a new pixel value, which is substituted for the old pixel value at the center point. After a new filtered vector has been formed from the new pixel values produced at successive center points by stepping down one acoustic vector, the kernel is shifted by one vector and stepped down range again. This process continues through the entire set of vectors until a new set of filtered vectors is formed. This filter will remove speckle holes on the order of one pixel in size while preserving good edge definition.

16 Claims, 5 Drawing Sheets

FILTER TO REDUCE SPECKLE ARTIFACT IN ULTRASOUND IMAGING

FIELD OF THE INVENTION

This invention generally relates to ultrasound imaging of human tissue and blood. In particular, the invention relates to a method and an apparatus for reducing the speckle artifact in an ultrasound image.

BACKGROUND OF THE INVENTION

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color.

Ultrasound imaging suffers from the inherent imaging artifact referred to as speckle. Speckle is the mottling found in the images produced from interference patterns of multiple receive echoes. This mottling is primarily caused by the null in the acoustic interference pattern, but other anomalies in the image, e.g., random electronic noise, can cause mottling. The acoustic nulls are accentuated by the log compression required to display the full dynamic range of the ultrasound image. These nulls appear as black holes in the image.

Since any parameter which changes the sum of the returning echoes will alter the speckle pattern, a number of conventional methods exist for reducing the speckle image artifact. Examples of such conventional methods include multiple transmit focussing, spatial compounding, frequency compounding and spatial low-pass filtering. The multiple transmit focussing, spatial compounding and frequency compounding techniques suffer from reduced frame rates, whereas spatial low-pass filtering has reduced resolution.

SUMMARY OF THE INVENTION

The present invention is a method and an apparatus for reducing speckle artifact in an ultrasound image which does not suffer from any of the aforementioned disadvantages of conventional techniques for reducing speckle artifact. The invention enhances the image quality in a medical ultrasound imaging system at only a small power and space cost.

The invention is a two-dimensional median filter which uses a diamond-shaped five-point kernel on acoustic line data. The entire pixel image data is passed through the filter in a manner such that the center point of the kernel is effectively stepped down each range vector in sequence. The magnitudes of the pixel data at each of the five points in the kernel are compared and the value which has the middle magnitude is adopted as a new pixel value, which is substituted for the old pixel value at the center point. After a new filtered vector has been formed from the new pixel values produced at successive center points by stepping down one acoustic vector, the kernel is shifted by one vector and stepped down range again. This process continues through the entire set of vectors until a new set of filtered vectors is formed. This filter will remove speckle holes on the order of one pixel in size while preserving good edge definition.

Important parameters in this design are the kernel size, the kernel shape, the filter function itself and the data domain filtered. These parameters are selected to maximize speckle reduction without image distortion or a high cost penalty.

In accordance with the invention, the kernel size is kept small in order to minimize the power, space and price penalties, while the kernel shape was selected for its equal pixel-to-center spacing, thereby minimizing any image distortion. A median filter having this kernel is used on pre-scan conversion data, since scan conversion changes the size of any speckle holes as the depth changes and would reduce the overall effectiveness of the median filter. Applying the filter before scan conversion also takes advantage of the scan conversion interpolator as a post-median low-pass filter. A scan converter converts the image data from polar coordinate (R-$\theta$) sector format or Cartesian coordinate linear array to appropriately scaled Cartesian coordinate display pixel data.

DETAILED DESCRIPTION OF THE PREFERRED EMBODIMENTS

The present invention is incorporated in an ultrasound imaging system consisting of four main subsystems: a beamformer 2 (see FIG. 1), midprocessors 4, a scan converter/display controller 6 and a kernel (not shown). System control is centered in the kernel, which accepts operator inputs through an operator interface and in turn controls the various subsystems. The kernel also generates the system timing and control signals which are distributed via a system control bus and a scan control bus (not shown).

Figure 1:
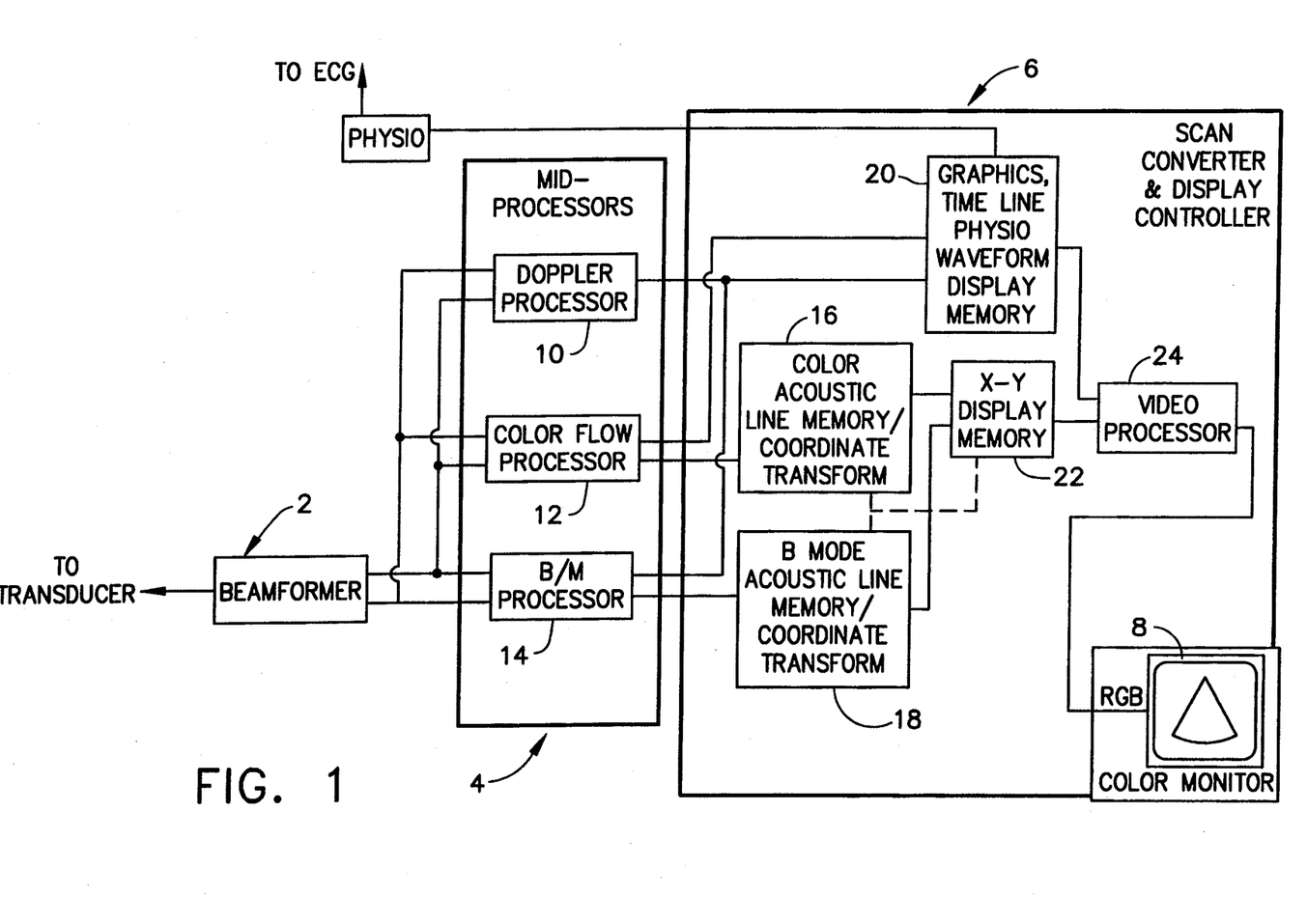
FIG. 1 is a block diagram showing the major functional blocks of a real-time ultrasound imaging system.

The main data path begins with the analog RF inputs to the beamformer from the transducer. In accordance with conventional practice, the beamformer outputs two summed digital baseband I,Q receive beams. The I,Q bus 8 is input to the midprocessors, where it is processed according to the acquisition mode and output as processed vector (beam) data to the scan converter/display processor. The scan converter accepts the processed vector data and outputs the video display signals for the image to a color monitor 8.

The beamformer is responsible for the transmit and receive beamforming. It includes an interface to the transducers; time delay boards containing the analog receive channel, the transmitter and digital channel and beamforming; equalization and TGC control; a front end controller; and a system timing generator. The beamformer's signal inputs are the low-level analog RF signals from the transducer elements. The data output of the beamformer is two (right and left) complex (I, Q) digital baseband receive beams.

The B/M midprocessor 14 converts the baseband I and Q data from the beamformer equalization board into a log-compressed version of the signal envelope. The B function images the time-varying amplitude of the envelope of the signal as a grey scale. The envelope of a baseband signal is the magnitude of the vector which I and Q represent. The I,Q phase angle is not used in the B/M display. The magnitude of the signal is the square root of the sum of the squares of the orthogonal components (I and Q).

The frequency of sound waves reflecting from the inside of blood vessels, heart cavities, etc. is shifted in proportion to the velocity of the blood cells: positively shifted for cells moving towards the transducer and negatively for those moving away. The Doppler midprocessor 10 computes the power spectrum of these frequency shifts for visual display and it also synthesizes an audio signal from the separated positive and negative shifts.

The color flow midprocessor 12 is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

The color flow midprocessor 12 (FIG. 1) receives the summed left and right, complex I/Q data from the beamformer 2 and processes it to calculate flow velocity, turbulence, and power for all sample volumes within an operator-defined region. The incoming data is rate converted and down-sampled such that the resulting number of data points is consistent with the output display resolution. The downsampling is done by point accumulation, and the combination of rate conversion and down sampling is such that the number of points in the range vector is equal to or greater than the number of display points, but fits into the available memory of the acoustic line buffer in the scan converter. The downsampled data is stored in a corner turner (not shown), whose purpose is to buffer data from possibly interleaved firings and output the data as vectors of points across firings at a given range cell.

The mean blood velocity, variance (representing blood turbulence) and total prenormalization power (which is a combination of postnormalized power R(0) and Shift) are calculated. The prenormalization power is possibly used as a threshold for the resulting velocity and turbulence estimates. These three output values are then combined into two final outputs, one primary and one secondary. The primary output will be eight bits and either VELOCITY or POWER will be selected. The secondary output will be four bits and can be either VARIANCE or POWER. Which two values will be displayed is determined by the operator-selected display mode. Both values are sent to the scan converter, where they will be scan converted separately.

The scan converter/display controller 6 accepts processed digital data from the midprocessors. The scan converter performs the coordinate transformation of the color flow (16) and B mode (18) data from polar coordinate (R-$\theta$) sector format or Cartesian coordinate linear array to appropriately scaled Cartesian coordinate display pixel data stored in X-Y display memory 22. The M mode and Doppler data types are interpolated in both dimensions (range and time for M or frequency and time for Doppler) in display memory 20. The video processor 24 displays the resulting image in a raster scan format on video monitor 8.

For B mode images, the B mode acoustic line memory (ALM) 18 acquires and stores the left and right data in a polar or Cartesian vector format from the B/M midprocessor 14. The coordinate transform function generates addresses used to map the information into a pixel value at a given X-Y coordinate for display. The mapping function utilizes a two-dimensional interpolation.

For color flow images, the color ALM 98 performs the same function as the B mode ALM. Each data stream (left and right) consists of up to two values per spatial data point: 8-bit velocity only, 8-bit velocity and 4-bit turbulence, 8-bit velocity and 4-bit power, or 8-bit power only. If two values are present, they are scan converted separately. The resulting scan-converted X-Y frame is then operated on as a single image.

The coordinate transform generates the R and $\theta$ or Cartesian to Cartesian addresses and error (interpolation factors) for the B mode ALM 18 and color ALM 20 to use in mapping from polar coordinate vector or Cartesian corrdiante linear array data to X-Y data. Additional image processing may be performed after scan conversion.

The video processor 24 multiplexes between the graphics/physio data, image data, and reference bar data to generate the final video output. Additionally it provides for various greyscale and color maps as well as combining the greyscale and color images.

Each acoustic line memory (16, 18 in FIG. 1) can be provided with a speckle-reducing filter in accordance with the present invention. This filter is a two-dimensional median filter which uses a diamond-shaped five-point kernel to reduce speckle artifacts in a stream of sector scan data taken in the R-$\theta$ coordinate domain.

Figure 2A:
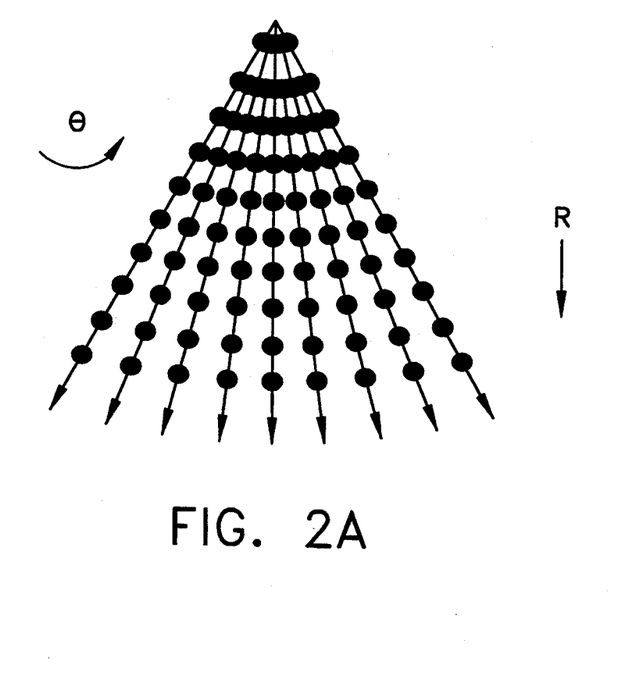
FIG. 2A is a diagram illustrating the format used in the acquisition and display of sector scan data by the beamformer of the system shown in FIG. 1.
Figure 2B:
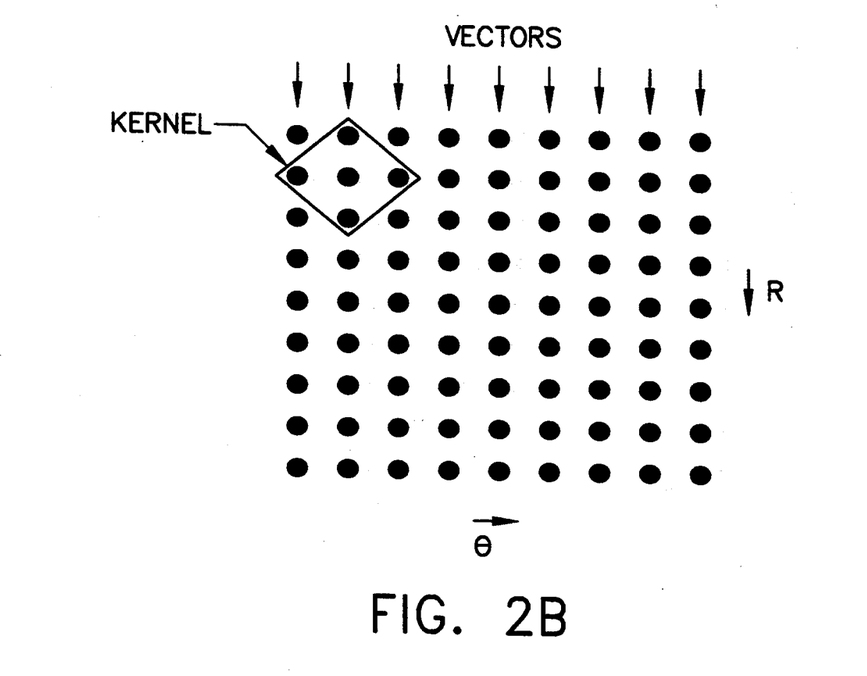
FIG. 2B is a diagram illustrating the concept of the median filtering of the present invention performed on sector scan data in a polar coordinate domain.

FIG. 2A illustrates the format used in the acquisition of sector scan data. A series of ultrasound beams are fired along each of a plurality of vectors directed at angles $\theta$, the beam for each firing being focussed at a different range R along the respective vector. The data is stored in rows and columns of memory as shown in FIG. 2B. Ultimately this data is scan converted from polar to Cartesian coordinates for display. The conversion of the diverging vectors to Cartesian coordinates requires the scan conversion to interpolate more data points in the far field than in the near field. This means the number of display pixels which must be interpolated increases with depth.

The concept of the median filtering of the invention is shown in FIG. 2B. The five-point kernel is moved down range relative to parallel vectors of sector scan data. The first, second and third adjacent vectors of sector scan data are processed at a time to form a first new filtered vector. Then the second, third and fourth adjacent vectors of sector scan data are processed to form a second new filtered vector, which will be adjacent to the first new filtered vector in this scheme. This process is repeated until a new set of parallel filtered vectors, forming a new filtered pixel image, has been acquired.

More specifically, the median filter kernel is effectively moved through the entire pixel image in a manner such that the center point of the kernel is stepped down each range vector in sequence (excluding the first and last range vectors and excluding the first and last data points of each vector). The magnitudes of the pixel data at each of the five points in the kernel are compared using the circuit shown in FIG. 5 and the value which has the middle magnitude is adopted as a new pixel value, which is substituted for the old pixel value at the center point. After a new filtered vector has been formed from the new pixel values produced at successive center points by stepping down one acoustic vector, the kernel is shifted by one vector and stepped down range again.

This filter will remove speckle holes on the order of one pixel in size while preserving good edge definition. The angular resolution of the data and thus the size of the speckle artifact is relatively constant when viewed in polar coordinate space, which means that a kernel of constant size is appropriate. The kernel size in the Cartesian coordinate space used for display would have to increase in size with an increase in depth to achieve the same effect. The scan conversion process provides some post-median low-pass filtering. This cleans up the image appearance by softening sharp edges which could be formed by the median filter.

Figure 3:
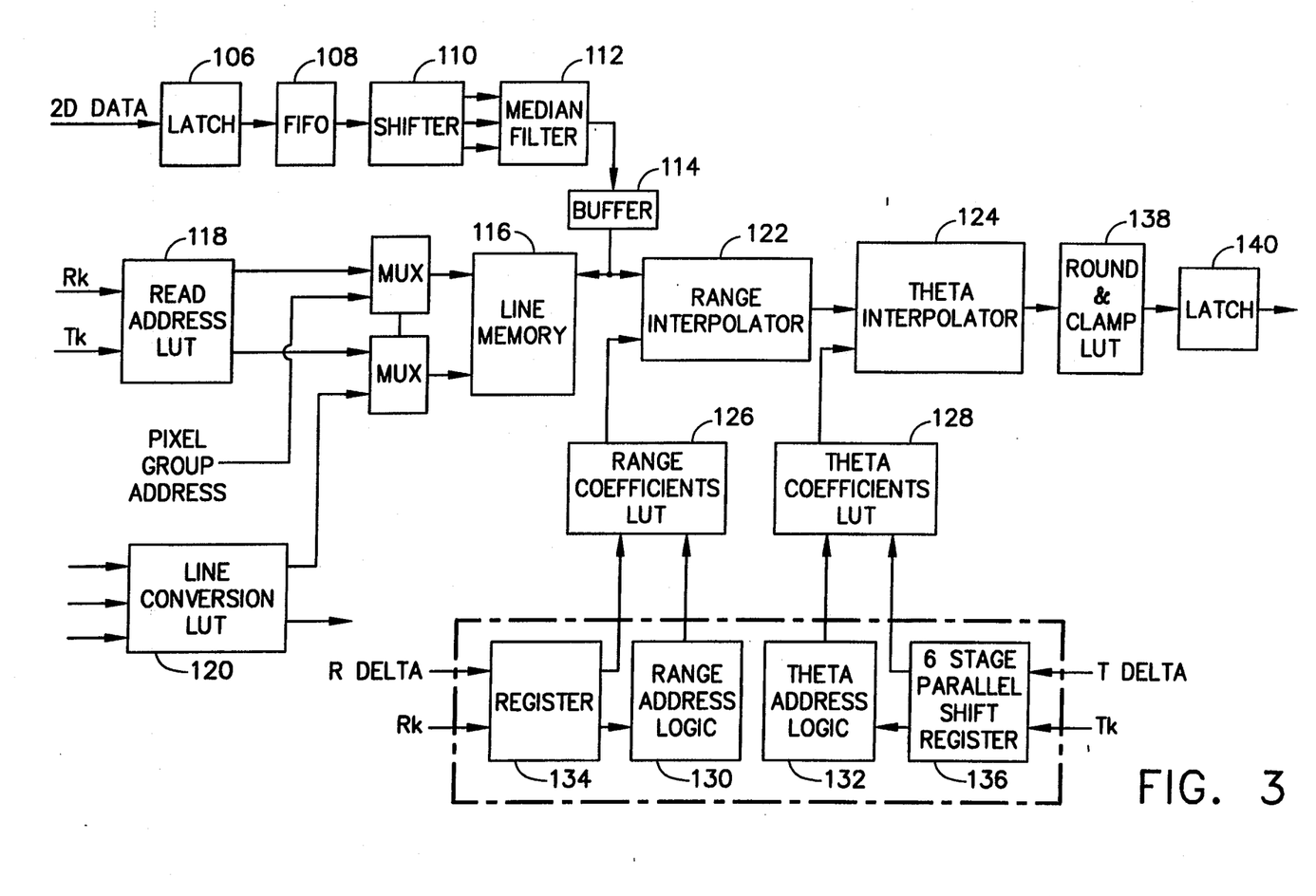
FIG. 3 is a logic diagram showing a B mode acoustic line memory incorporating the median filter of the present invention.

The circuitry for a B mode acoustic line memory, without the coordinate transform circuitry which generates the R and θ addresses and interpolation factors and incorporating the median filter of the invention, is shown in FIG. 3. The two-dimensional data is input to a latch 106, which outputs the 8 bits of each vector value in series to a FIFO 108. The 8-bit values are further output by FIFO 108 to a shifter 110, which shifts each vector successively into first, second and third ports of the median filter 112. For each trio of vectors input to median filter 112, the filter outputs a single new filtered vector to buffer 114 by substituting the corresponding middle magnitude of a five-point kernel for each successive point of the middle vector. The new filtered vectors are stored in line memory 116 in a Cartesian coordinate domain in accordance with the read address and line conversion look-up tables (LUTs) 118 and 120. These stored points are then passed through the range and theta interpolators 122, 124, which output interpolated pixel values corresponding to a wedge-shaped display in the Cartesian or linear domain. When the number of input points exceeds the number of pixels, the interpolators select which input points to use; when the number of pixels exceeds the number of input points, the interpolators provide interpolated pixel values at any X-Y location where an input point may be missing. This interpolation is performed based on range and theta coefficients read from look-up tables (LUTs) 126, 128 by range and theta address logic 130, 132 in response to interpolation factors received by registers 134, 136 from the coordinate transform circuitry (not shown in FIG. 5). The interpolated values are rounded and clipped by process 138 to eliminate negative values and values greater than 255. The rounded and clipped values are then output to latch 140, which in turn outputs the values to the X-Y display memory 22.

Figure 4:
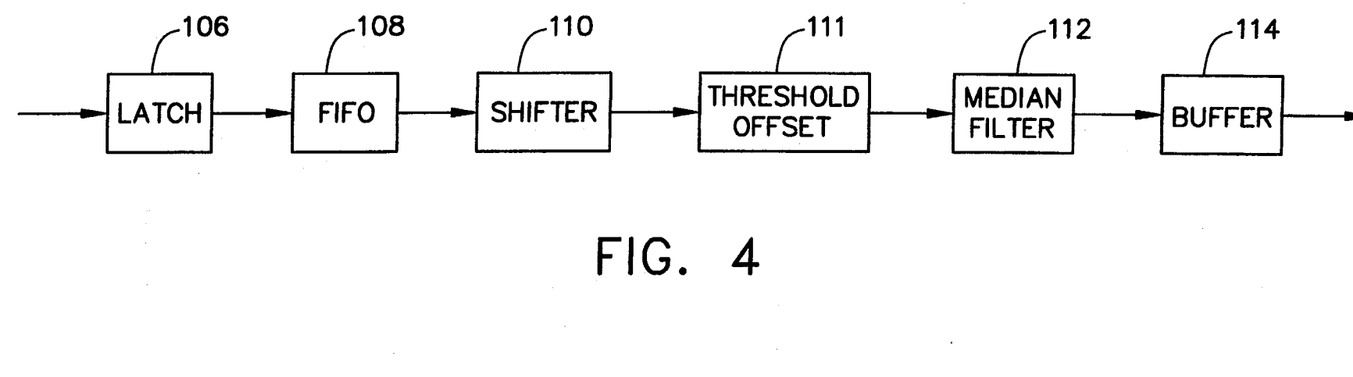
FIG. 4 is a logic diagram showing a portion of a color acoustic line memory preceding and including the median filter in accordance with the present invention.

The median filter of the invention can also be incorporated in the color acoustic line memory 16 as generally depicted in FIG. 4. The only difference is that a threshold offset 111 is inserted between shifter 110 and median filter 112 to allow use with 2's complement data.

Figure 5:
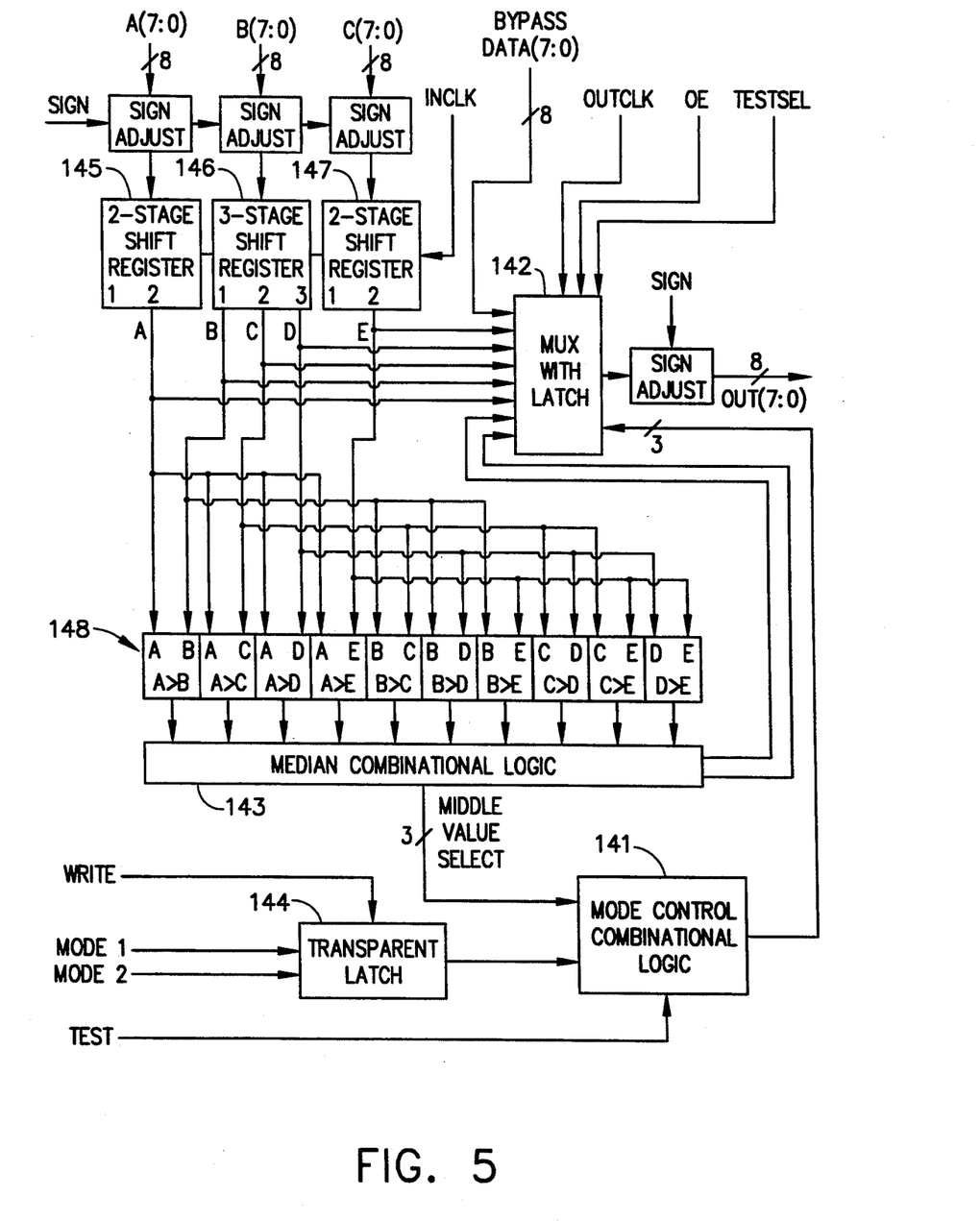
FIG. 5 is a logic diagram showing the two-dimensional median filter circuit in accordance with the preferred embodiment of the present invention.

In accordance with the preferred embodiment, the median filter circuit is implemented in a CMOS gate array integrated circuit. This circuit has four modes of operation along with a data type select. Referring to FIG. 5 and the Table below, when the mode select pins enable median filtering, the output from the chip becomes the middle ranked value of the A, B, C, D and E internal data paths. Two modes exists where the data is not filtered. The first such mode simply directs the unmodified bypass data input to the data output and the second such mode directs the C internal data path to the output data pins. This second nonfiltering method is useful since it will have the same data delays as when filtering is ON. The Diagnostic mode enables the TESTSEL pins to direct any of the five internal data paths or some other internal test points to the output. In the Data Type mode, a sign bit selects either 2's complement or unsigned data types. The 2's complement mode will invert the MSB before and after filtering to maintain the rank of the data and allow proper median filtering.

| Input Mode | | |
|---|---|---|
| 1 | 2 | Operation |
| 0 | 0 | Median filtering ON |
| 0 | 1 | No filtering; bypass data input directed to output |
| 1 | 0 | No filtering; internal data path C directed to output |
| 1 | 1 | Diagnostic ON |

Mode control is handled by combinational logic 141, which conditions the select lines of multiplexer 142. The nonfiltering modes will force the select lines into states which direct either the bypass data path or the C internal data path to the output. The Median Filter On mode will simply allow the multiplexer select lines to be driven by the median combinational logic 143. The output multiplexer latch and the mode select latch 144 are transparent. This allows for the connection of the mode select lines to either a time-multiplexed bus or static control lines and the outputting of data without clocking.

The input registers 145-147 will form the kernel shape and acquire the data for filtering. The A and C input registers are two register levels deep and the B input register is three levels deep, so that the kernel shown in FIG. 2B is implemented. The A, B, C, D and E data buses from the input registers are presented to a bank 148 of magnitude comparators in all combinations possible to create a complete set of comparisons which point to the middle magnitude data path. These comparisons are decoded by the median combinational logic 143 to select the correct multiplexer output.

The foregoing preferred embodiment has been disclosed for the purpose of illustration. Variations and modifications will be readily apparent to those skilled in the art of ultrasonic imaging systems. All such variations and modifications are intended to be encompassed by the claims set forth hereinafter.

We claim:

1. An ultrasound imaging system comprising:
   a plurality of ultrasonic transducer elements for transmitting ultrasound beams along first, second and third paths of propagation through an object in a transmission mode;
   vector acquiring means for acquiring first, second and third vectors of image data, said image data of said first through third vectors being derived from the reflection by said object and the reception by said ultrasound transducer elements in a reception mode of portions of said ultrasound beams transmitted along said first through third paths of propagation respectively, each of said first through third vectors including at least first, second and third values acquired at first, second and third ranges respectively;

median filtering means for substituting the middle value amongst said second values of said first and third vectors and said first through third values of said second vector for said second value of said second vector; and means for displaying image data which includes said middle value.

2. The ultrasound imaging system as defined in claim 1, wherein said median filtering means comprises first through third shift registers, said first shift register storing said second value of said first vector, said second shift register storing said first through third values of said second vector, and said third shift register storing said second value of said third vector during a cycle.

3. The ultrasound imaging system as defined in claim 2, wherein said median filtering means further comprises a plurality of comparators for comparing said second values of said first and third vectors and said first through third values of said second vector with each other.

4. The ultrasound imaging system as defined in claim 3, wherein said median filtering means further comprises median combinational logic coupled to receive outputs from each of said comparators, and multiplexing means coupled to said first through third shift registers and to said median combinational logic for latching the middle value amongst said second values of said first and third vectors and said first through third values of said second vector in response to control signals from said median combinational logic.

5. The ultrasound imaging system as defined in claim 2, wherein said vector acquiring means comprises a latch, a FIFO and a shifter connected in series, said shifter having first through third 8-bit ports connected to said first through third shift registers of said median filtering means.

6. The ultrasound imaging system as defined in claim 1, wherein said vector acquiring means comprises a latch, a FIFO and a shifter connected in series.

7. The ultrasound imaging system as defined in claim 1, wherein said vector acquiring means comprises a latch, a FIFO, a shifter and a threshold offset connected in series.

8. The ultrasound imaging system as defined in claim 1, further comprising scan conversion means for generating addresses used to map the output of said median filtering means into a pixel value at a given X-Y coordinate for display.

9. The ultrasound imaging system as defined in claim 1, wherein said image data comprises ultrasound amplitude data.

10. The ultrasound imaging system as defined in claim 1, wherein said image data comprises ultrasound Doppler shift data.

11. A method for reducing speckle artifact in an ultrasound image, comprising the steps of:

transmitting ultrasound beams along first, second and third paths of propagation through an object by activation of a plurality of ultrasonic transducer elements in a transmission mode;

acquiring first, second and third vectors of image data, said image data of said first through third vectors being derived from the reflection by said object and the reception by said ultrasound transducer elements in a reception mode of portions of said ultrasound beams transmitted along said first through third paths of propagation respectively, each of said first through third vectors including at least first, second and third values acquired at first, second and third ranges respectively;

selecting said second values of said first and third vectors and said first through third values of said second vector;

determining the middle value amongst said second values of said first and third vectors and said first through third values of said second vector;

substituting said middle value for said second value of said second vector; and displaying image data which includes said middle value.

12. The method for reducing speckle artifact in an ultrasound image as defined in claim 11, further comprising the steps of:

acquiring said first through third vectors of image data so that each of said first through third vectors includes first through N-th values acquired at first through N-th ranges respectively, where N is a positive integer;

selecting the n-th values of said first and third vectors and the $(n-1)$-th, n-th and $(n+1)$-th values of said second vector, whereby a five-point kernel is formed for each n-th value in the range $n=2$ to $(N-1)$ inclusive, where n is a positive integer;

for each kernel, determining the middle value amongst said n-th values of said first and third vectors and said $(n-1)$-th, n-th and $(n+1)$-th values of said second vector; and for each kernel, substituting said respective middle value for said n-th value of said second vector, whereby a new filtered second vector is formed.

13. The method for reducing speckle artifact in an ultrasound image as defined in claim 12, further comprising the steps of:

directing ultrasound beams along fourth through M-th paths of propagation;

acquiring first through M-th vectors of image data, said first through M-th vectors corresponding to ultrasound beams directed along said first through M-th paths of propagation respectively, where M is a positive integer, each of said first through M-th vectors including first through N-th values acquired at first through N-th ranges respectively;

selecting the n-th values of said $(m-1)$-th and $(m+1)$-th vectors and the $(n-1)$-th, n-th and $(n+1)$th values of said m-th vector, whereby a five-point kernel is formed for each n-th value in the range $n=2$ to $(N-1)$ inclusive for each m-th vector in the range $m=2$ to $(M-1)$ inclusive, where m is a positive integer;

for each kernel, determining the middle value amongst said n-th values of said $(m-1)$-th and $(m+1)$-th vectors and the $(n-1)$-th, n-th and $(n+1)$-th values of said m-th vector; and for each kernel, substituting said respective middle value for said n-th value of said m-th vector, whereby a new set of filtered second to $(M-1)$-th vectors are formed.

14. The method for reducing speckle artifact in an ultrasound image as defined in claim 13, further comprising the step of generating addresses used to map said new set of filtered second to (M−1)-th vectors into pixel values at given X-Y coordinates for display.

15. The ultrasound imaging system as defined in claim 11, wherein said image data comprises ultrasound amplitude data.

16. The ultrasound imaging system as defined in claim 11, wherein said image data comprises ultrasound Doppler shift data.

* * * * *